H. J. SMITH.
CONVERTIBLE MOLD FOR FORMING RUBBER TIRES.
APPLICATION FILED NOV. 18, 1915.
1,211,886.
Patented Jan. 9, 1917.
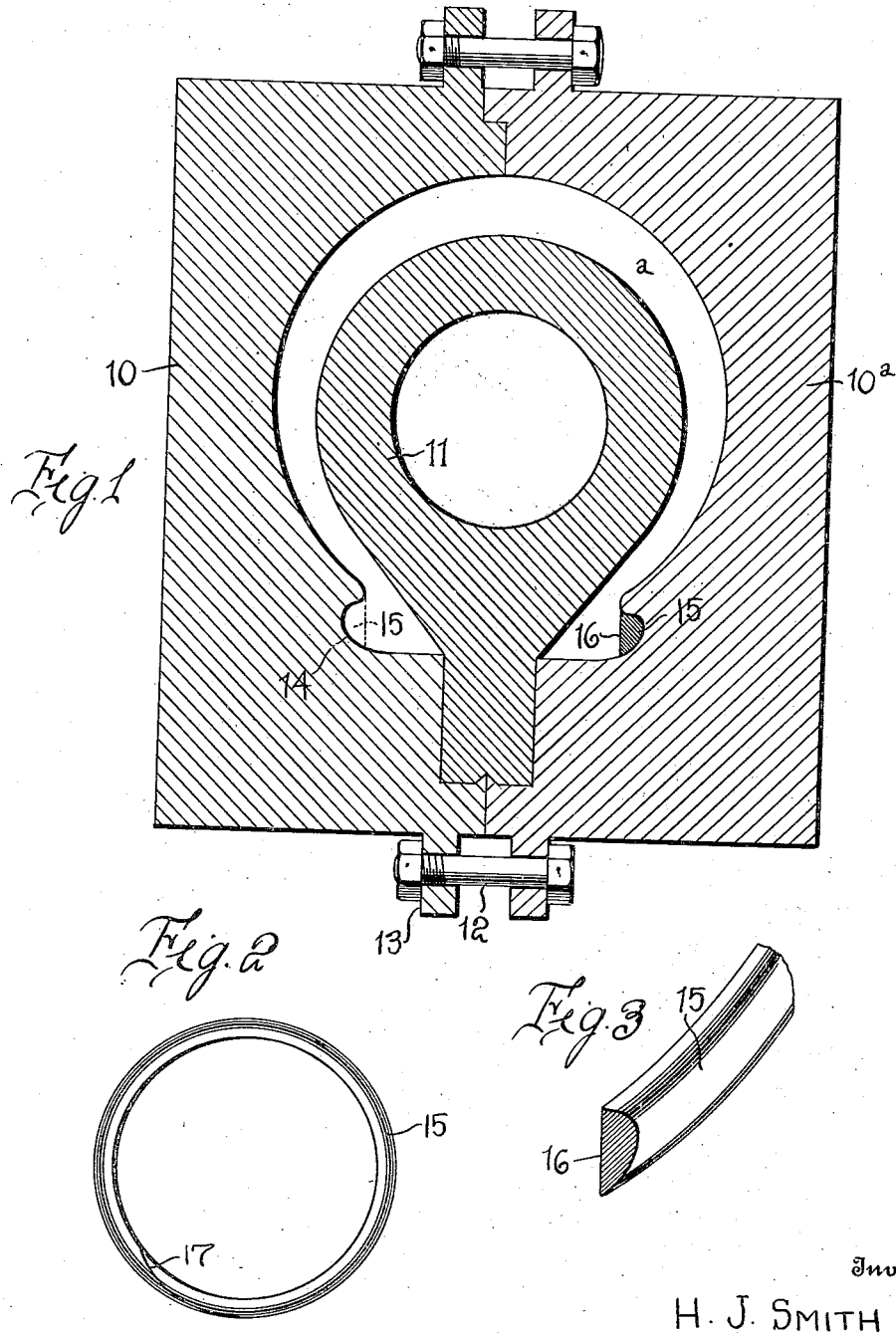
Inventor
H. J. SMITH
By Watson E. Coleman
Attorney

UNITED STATES PATENT OFFICE.

HARRY J. SMITH, OF NEW CASTLE, PENNSYLVANIA, ASSIGNOR OF ONE-HALF TO JOHN S. WILSON, OF PITTSBURGH, PENNSYLVANIA.

CONVERTIBLE MOLD FOR FORMING RUBBER TIRES.

1,211,886.  Specification of Letters Patent.  Patented Jan. 9, 1917.

Application filed November 18, 1915. Serial No. 62,183.

*To all whom it may concern:*

Be it known that I, HARRY J. SMITH, a citizen of the United States, residing at New Castle, in the county of Lawrence and State of Pennsylvania, have invented certain new and useful Improvements in Convertible Molds for Forming Rubber Tires, of which the following is a specification, reference being had to the accompanying drawings.

This invention relates to the manufacture of pneumatic tires, and particularly to the means whereby the tires are molded under pressure.

In the manufacture of pneumatic tires the sheets of laminated fabric and rubber are disposed in a mold comprising opposite sections and a core, and in this mold the sheets are subjected to great pressure to form the sheets into the complete tire. So far as I am aware, different styles of molds are necessary for each type of tire. Thus one style is used for a clencher tire, another form is used for a quick detachable tire, and a third form for tires having straight sides instead of clencher beads.

The general object of this invention is the provision of means whereby a mold having a mold surface conforming to one type of tire may be temporarily changed to conform to the shape of another type so that tires of this last-named type may be molded in molds originally designed for the formation of another type.

A further object of the invention is the provision of a filler which may be used to entirely or partly fill up the clencher bead groove of a mold designed for molding clencher tires, which filler is removable so that the mold may be used for forming either the straight-sided tire or the clencher tire.

Other objects will appear in the course of the following description.

My invention is illustrated in the accompanying drawings, wherein:

Figure 1 is a transverse section of a mold for forming clencher tires, the filler whereby the bead groove of the mold is filled up being shown in section on one side of the mold and by dotted lines on the other side of the mold; Fig. 2 is a side elevation of the filler; Fig. 3 is a perspective fragmentary view of the filler.

Referring to the figures, 10 and 10ª designate opposed mold sections of any ordinary or suitable type, and 11 designates the core also of any ordinary or suitable type. My invention does not lie in the mold sections nor in the core nor in the manner of connecting the mold sections and the core, as all of these parts are such as commonly used in the construction of pneumatic tires. I have illustrated these mold sections as being drawn toward each other to compress the material in the mold space by means of bolts 12 passing through ears 13, but this is purely illustrative.

As illustrated in Fig. 1 the core 11 and the mold sections 10 and 10ª together define an annular space *a* having in cross section the shape of the ordinary pneumatic tire of the clencher type, and the mold sections being channeled or grooved, as at 14, to form the clencher beads of the tire. The exact shape of these bead grooves 14 is not of importance and may have any desired shape adapted to mold the clencher beads to any particular form.

The mold shown in Fig. 1 is intended for the production of tires of the clencher or quick detachable type having laterally projecting clencher beads. If it is desired to mold a tire having straight sides instead of having clencher beads, mold sections must be used having their mold surfaces conforming to the straight sides of the tire to be manufactured. As before stated, my invention is designed to do away with this necessity of having different molds for different types of tire, and it consists in the provision of an annulus designated 15, this annulus having one side curved or otherwise formed to conform exactly to the bead groove 14 and its other side flat as at 16 so that when the annulus is in place, as illustrated on the right hand side of Fig. 1, it will entirely fill up the bead groove so that the mold section will be capable of molding straight-sided tires. It is to be understood that the face 16 need not be necessarily exactly straight as it might have some other shape or configuration suitable for molding the side face of the tire, but I have illustrated a filler which is capable of changing a mold designed for forming clencher tires into a mold for forming straight-sided tires. As illustrated, this filler 15 is split at 17, this split extending tangentially to the periphery of the filler. This filler may be made of metal or of any other suitable material but is preferably of resilient material so that it will securely hold in place when sprung into the bead groove and is preferably of metal so as to present a smooth face and be able to stand the great pressure to which it is subjected.

By my invention a factory can manufacture two or more kinds of tires with one set of molds, and furthermore, these annular fillers need not be used in conjunction with the mold sections 10 and 10ª of the form shown in Fig. 1 but may be also used with the flange rings or mold annuli as used in the Thropp system of manufacturing single core wrapped tread tires, as in this case also there are opposed mold sections, these mold sections being formed with bead grooves, which bead grooves may be filled up by means of the fillers described. My device may be used on any mold in use to-day for molding tires. The use of these fillers will reduce the cost of the apparatus used in the manufacture of tires, and the device has been found of great convenience and utility.

Having described my invention, what I claim is:

1. The combination with a mold section for forming pneumatic tires, the interior face of the section having a clencher bead groove, of an annular filler removably disposed within said groove.

2. The combination with a mold section for forming tires, the interior face of the section having an annular mold space and a clencher bead groove, of an annular filling member removably disposed in said groove and when in place filling said groove.

3. The combination with a mold section for forming pneumatic tires, the interior face of the section having an annular mold space and an annular clencher bead groove, of an annular resilient filling ring removably disposed in said groove and when in place fitting against the walls of the groove and filling it up.

4. The combination with a mold section for forming pneumatic tires, the interior face of the section having an annular mold space and an annular clencher bead groove, of an annular resilient filling ring removably disposed in said groove and when in place fitting against the walls of the groove and filling it up, said ring being split and being overlapped at the split portion of the ring.

5. The combination with a mold for forming pneumatic tires, said mold comprising opposed sections, a core and means for drawing the sections toward each other, the inner face of each section being formed with a clencher groove, of annular members disposable in the clencher grooves of each section, fitting said grooves and partially or entirely filling up the grooves.

6. As an article of manufacture, a device for filling the clencher bead grooves of pneumatic tire molds consisting of a ring of suitable material, one face of the ring being flat and the other face rounded to fit the clencher bead groove.

In testimony whereof I hereunto affix my signature in the presence of two witnesses.

HARRY J. SMITH.

Witnesses:
A. E. GORDON,
GEO. S. MILLER.